Oct. 19, 1965  J. C. BASSO  3,212,373

APPARATUS FOR POSITIONING A WORK PIECE IN A MACHINE

Original Filed June 22, 1960  2 Sheets-Sheet 1

INVENTOR.
JOSEPH C. BASSO
BY
ATTORNEYS

Oct. 19, 1965   J. C. BASSO   3,212,373
APPARATUS FOR POSITIONING A WORK PIECE IN A MACHINE
Original Filed June 22, 1960   2 Sheets-Sheet 2

INVENTOR.
JOSEPH C. BASSO
BY
ATTORNEYS

United States Patent Office 3,212,373
Patented Oct. 19, 1965

3,212,373
APPARATUS FOR POSITIONING A WORK PIECE IN A MACHINE
Joseph C. Basso, Trenton, N.J., assignor, by mesne assignments, to De Laval Turbine, Inc., Trenton, N.J., a corporation of Delaware
Original application June 22, 1960, Ser. No. 38,052. Divided and this application Aug. 11, 1961, Ser. No. 130,963
3 Claims. (Cl. 82—33)

This is a division of my co-pending application, Serial No. 38,052, filed June 22, 1960.

This invention is directed to apparatus for positioning a work piece in machines such as lathes, grinders and the like.

In lathes, grinders and the like where it is desired to have a very accurate work piece roundness and minimum eccentricity, it is essential that the male and female menters for supporting the work piece be in alignment with each other within a close tolerance. If the supporting centers are misaligned the work piece will wobble as it rotates during the grinding or cutting operation causing lobes to be formed thereon. This is undesirable in many applications, as for example, in the manufacture of journals, where lobes will result in unbalanced operation of the journal.

It is also desirable that the female centers be centrally positioned with respect to the work piece so that there will be a minimum of "humping" as the work piece rotates. Humping results from a high point on the work piece with respect to the work piece supporting center.

One problem that is encountered in positioning a work piece in machines of the indicated type is that no adequate technique has been found to align the headend and the tailend centers when they must be spaced a considerable distance for mounting a long work piece. In the usual practice, the centers are aligned at a close position and then the tailend center is retracted to the position necessary to receive the work piece. During this retracting movement, the centers are moved out of alignment by reason of the slight misalignment of the machine track for guiding the tailstock movement. This slight track misalignment is found in almost all machines of the indicated type.

Another problem that is encountered results from the lubrication of the bearing surface between the male and female centers. Since it is difficult to obtain adequate lubrication at this bearing surface, the female centers used in the past are provided with grooves extending in a straight line along the conical surface of the female center in an axial direction. While such a construction does provide some oil to the bearing surface, the linear grooves cause dead spots which cause a dipping action as the work piece rotates to cause small projections to be formed thereon. It is an object of the present invention to provide a novel adjustable center assembly for mounting a work piece on a machine of the indicated type.

Another object of this invention is to align the work piece supporting centers by a method which will overcome the aforementioned problems of misalignment.

The above and other objects and features of the invention will become apparent from a consideration of the following description read in conjunction with the accompanying drawings, in which.

Figure 1:
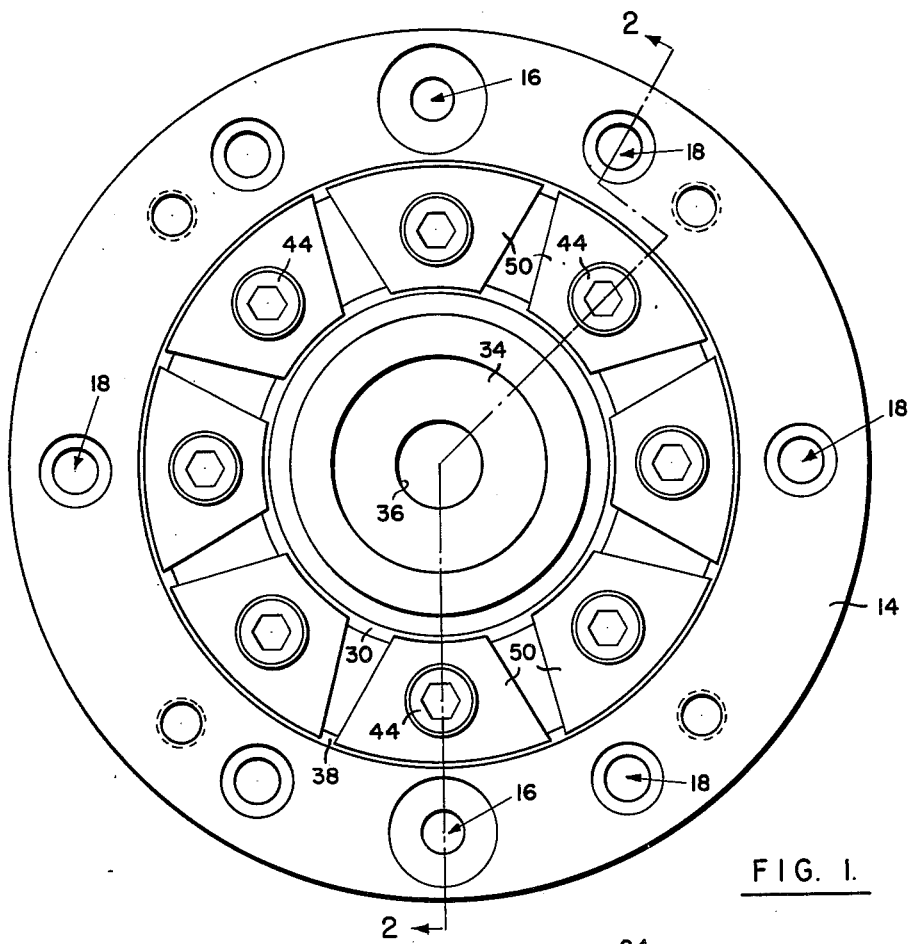
FIGURE 1 is a view of an adjustable female center assembly in accordance with this invention.
Figure 2:
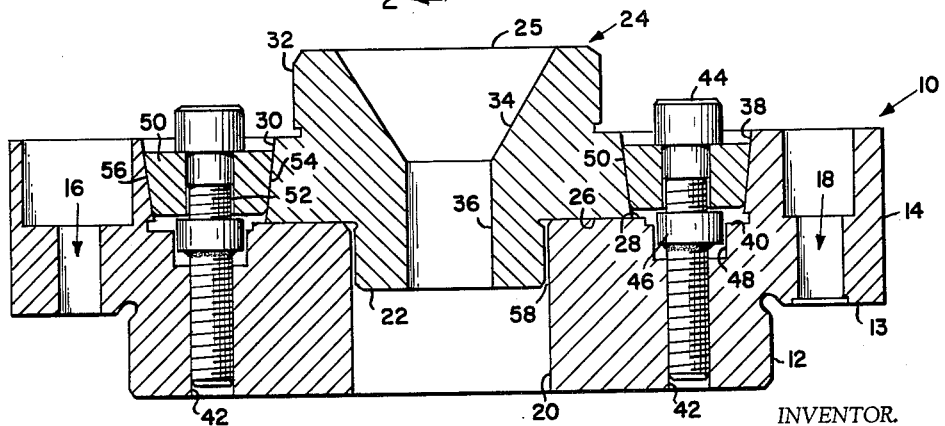
FIGURE 2 is a section taken on a plane indicated by the line 2—2 of FIGURE 1.

The female adjustable center assembly, which is shown in FIGURES 1 and 2, comprises a substantially cylindrical supporting member or plug 10 which has cylindrical portion 12 which may be adapted to project into a work piece. Portion 12 is adjacent a flange portion 14 which is adapted to be used for attaching the plug 10 to the work piece and has a radial shoulder 13. Portion 14 has a pair of oppositely disposed, counterbored holes 16 adapted to receive tapered pins for dowelling the plug 10 to the work piece. Portion 14 also has six circumferentially spaced, counterbored holes 18 adapted to receive bolts which are threaded into the work piece.

Plug 10 has a central bore 20 adapted to receive a projecting end 22 of a female center 24. The center 24 has an annular shoulder 26 adapted to slidably contact an annular shoulder 28 formed on plug 10 adjacent central bore 22 and extendind perpendicularly to the axis of plug 10. The center 24 has a conical rim portion 30 inclined at an angle of 6° from shoulder 26 and a cylindrical rim portion 32 projecting from plug 10. The center 24 also has a conical bore 34 joined by a cylindrical bore 36, which bores are adapted to receive a male center. The conical bore 34 has a 60° apex angle and is formed so that the axis thereof coincides with the axis of rim 32 within a tolerance of ten millionths of an inch whereby a roundness test reading on rim 32 will, in effect, be a reading of the conical bore 34. Shoulders 12, 13 and 28 are accurately machined so as to be perpendicular and parallel to the axis of plug 10 within an accuracy of two ten-thousandths of an inch. Shoulder 26 and the front face 25 of center 24 are square with respect to the center axis within ten millionths of an inch. Thus, the lateral movement of center 24 and the front face 25 with respect to the adjustable center assembly is very accurate.

Plug 10 has an inwardly facing conical rim 38 oppositely disposed from rim 30 and having a 6° inclination opposite to the inclination of rim 30. The plug 10 also has an annular recess 40 concentrically bounding shoulder 28 and eight circumferentially equally spaced threaded holes 42 extending axially of plug 10 and recess 40. A plurality of bolts 44 threadedly engage holes 42 and have a collar 46 welded thereon at a central portion thereof. Collars 46 are adapted to be received in counterbores 48 of holes 42. A wedge 50 is mounted on each bolt 44 between the bolthead and the collar 46. The bolt 44 passes through a central bore 52 in the wedge 50. Collar 46 is spaced from the bolthead a distance greater than the wedge thickness and bore 52 is slightly greater than the diameter of the bolt whereby the wedges 50 and the bolts 44 are slidable relative to each other. Each of the wedges 50 has a face 54 shaped to conform to and contact the conical rim 30 of center 24 and a face 56 shaped to conform to and contact the conical rim 38 on plug 10.

The center 24 is adjustable laterally by movement of the wedges 50 which cam the center 24 laterally with shoulders 26 and 28 serving to guide the adjusting movement perpendicular to the center assembly axis. Rotation of the bolts 44 in a direction to cause axial movement thereof into the holes 42 forces the wedges 50 inwardly, by means of the wedges being contacted by the bolthead, to thereby cam center 24 laterally toward the center assembly axis. Since this movement will be resisted by the wedges oppositely disposed from the adjusting wedges, the resisting wedges are loosened to permit the desired center movement. In order to loosen the wedges, the bolts thereof are rotated in a direction causing axial movement out of the engaging holes whereby the collars 46 contact the wedges 50 to cause a corresponding wedge movement.

By suitable manipulation of the wedges 50 by the bolts 44, the center 24 may be adjusted to a desired position which may be measured by suitable means to be hereinafter described.

The range of adjustment of center 24 is limited by the spacing between the projecting center end 22 and the bore 20, which space is indicated at 58. This space will not ordinarily be very large by reason of the accurate machining of the whole center assembly. Since the adjustment of center 24 is relatively small, the axial movement of the wedges 50 is also relatively small. Thus, there is no problem of non-sitting of the conical surfaces 54 and 56 of the wedges 50. Hence, the radius of curvature of surface 54 may be substantially the same as the radius of curvature of its cooperating conical rim 30 and the radius of curvature of the surface 56 may be substantially the same as its cooperating surface 38.

Figure 4:
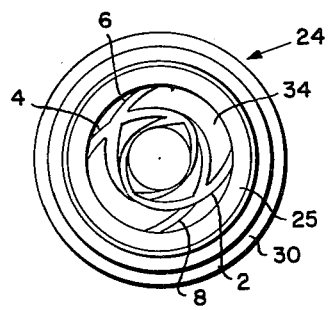
FIGURE 4 is an elevational view of a female center having oil grooves in accordance with this invention.

In order to eliminate dead spots and increase the flow of oil between the male and female contact surfaces the female center 24 may be constructed as shown in FIGURE 4. In this form of female center, the conical portion 34 has a pair of spiral grooves 2 and 4 running in a clockwise direction and a pair of spiral grooves 6 and 8 running in a counterclockwise direction. Each of the grooves extends from the outer end of conical portion 34 and a distance greater than 180° angularly about the surface of conical portion 34. By this construction there is no radial portion on conical portion 34 where the male center would not contact a substantial area of the surface of conical portion 34 whereby there will be no dead spots. Also the spiral grooves serve to pull oil toward the inner portion of the center as the center rotates to thereby provide a better lubrication between the male and female centers.

Figure 3:
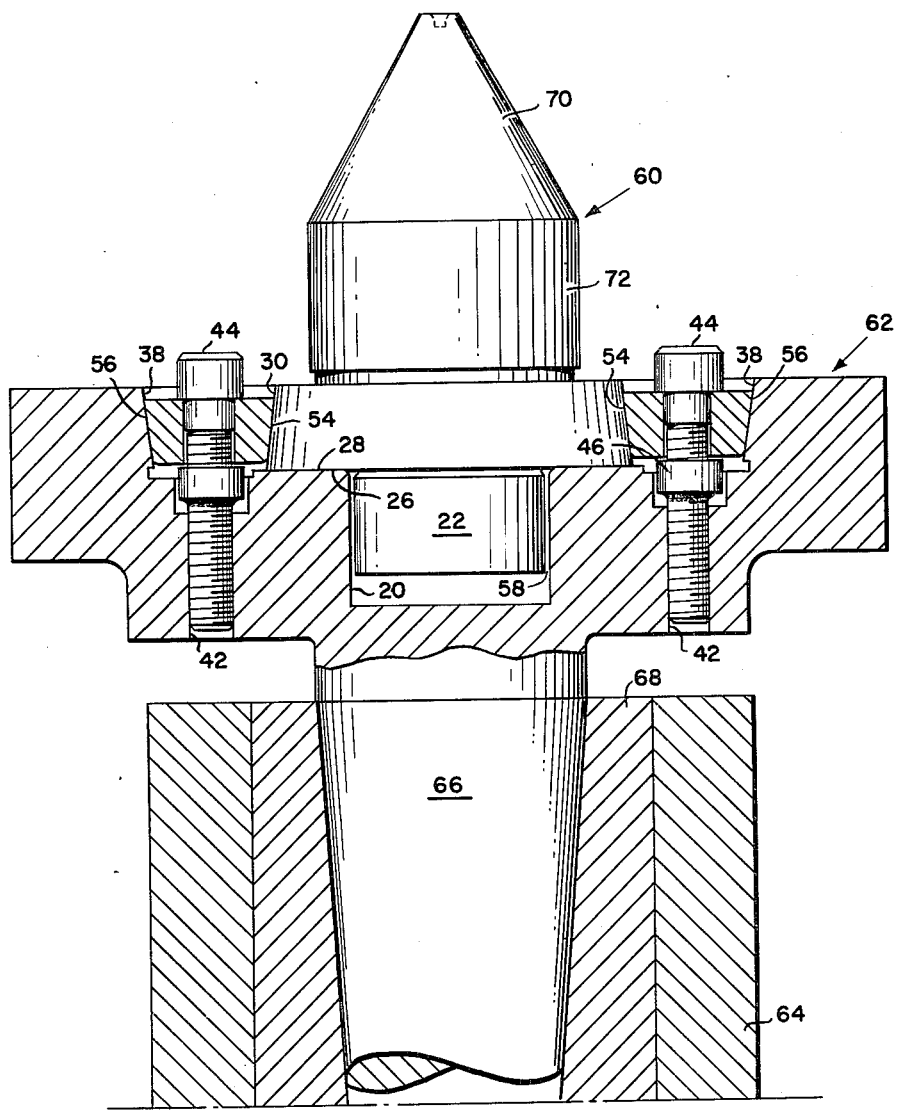
FIGURE 3 is a sectional view of an adjustable male center assembly in accordance with this invention.

The adjustable male center assembly shown in FIGURE 3 is similar to the female center assembly and like parts have been given the same reference numerals. The male assembly may have a similar wedge arrangement for adjusting the center 60 thereof. There are no dowel or attaching holes required since the male plug 62 is supported on the lathe tailstock 64 by means of a projecting end 66 having a Jarno taper fitted into a sleeve 68 mounted in the tailstock 64. Instead of a conical female bore, a male conical projection 70 joined with a cylindrical portion 72 is provided to form the male center 60. The axes of conical projection 70 and cylindrical portion 72 are in alignment within an accuracy of 20 to 30 millionths of an inch. Conical projection 70 is adapted to coact with a female center and has an apex angle of 60°. The male center 60 is adjusted by means by the wedges 50 in the same manner as the female center 24.

The adjustable center assemblies in accordance with this invention permit very minute adjustments by reason of the wedge arrangement. It is noted that the adjustments are ultimately determined by the advancing movement of the bolts, which is dependent on pitch of the bolt threads. Thus, the center may be adjusted a very small distance so that very accurate center positions may be attained. Also, the eight wedges contacting the center at eight arcs provide a very rigid support for the center. Smaller diameter center assemblies may employ four wedges.

It will be understood that the invention is not to be regarded as limited by the specific disclosure herein but only by the scope of the following claims.

What is claimed is:

1. An adjustable center assembly for positioning a work piece comprising a center having a circular rim portion, and means supporting said center for lateral movement including a member defining an inwardly facing rim and enclosing said center rim and oppositely disposed therefrom, said rims being oppositely inclined relative to the rim axes to form truncated conical faces spaced a greater distance at oppositely disposed ends thereof, a plurality of wedges between said rims circumferentially spaced thereabout, said wedges having inner and outer faces contacting and conforming to said member rim and said center rim, respectively, said center having a shoulder extending perpendicular to the center axis with a high degree of accuracy and said member having a shoulder cooperating with said center shoulder to guide said center for lateral movement perpendicular to the center axis, and means for individually moving each of said wedges axially of said rims to cause lateral movement of said center.

2. A center assembly as claimed in claim 1 wherein said wedge moving means comprises axially movable screws extending through each of said wedges and threadedly engaging said member and means carried by said screws contacting said wedges upon axial movement of said screws in either direction.

3. An adjustable center assembly for positioning a workpiece comprising a center member having a bearing wall portion defining the center axis and adapted to engage a cooperating center in the use of the center assembly, a second wall portion extending about the center axis and concentric with said bearing wall portion with a high degree of accuracy whereby a test reading on said second wall portion will be indicative of the condition of the bearing wall portion, and a rim portion, and means supporting said center member for lateral movement including a support member defining a rim portion spaced from said center rim portion, and a plurality of wedges between said rims circumferentially spaced thereabout, said wedges having cam surfaces contacting said rims and being movable to cam said center member laterally, said center member having a shoulder extending perpendicular to the center axis, said support member having a shoulder cooperating with said center shoulder to guide said center member for lateral movement perpendicular to the center axis, said second wall portion being cylindrical and projecting outwardly from said rim portions and said wedges so as to be accessible for contact in test readings.

References Cited by the Examiner

UNITED STATES PATENTS

| | | | |
|---|---|---|---|
| 1,479,952 | 6/24 | Boyce | 82—33 |
| 1,967,004 | 7/34 | Braden | 82—33 |
| 2,247,721 | 7/41 | Wright | 82—33 |
| 2,343,626 | 3/44 | Adas | 82—33 |
| 2,693,695 | 11/54 | Jacobsen | 82—45 X |
| 2,725,777 | 12/55 | Benson | 82—33 |
| 2,809,044 | 10/57 | Landreth | 82—45 X |
| 2,898,120 | 8/59 | Goepfrich | 279—6 X |

ANDREW R. JUHASZ, *Primary Examiner.*

RICHARD H. EANES, WILLIAM W. DYER, JR.,
*Examiners.*